(12) United States Patent
Galicia

(10) Patent No.: US 9,216,835 B2
(45) Date of Patent: Dec. 22, 2015

(54) TRANSLATING APPLICATION LABELS

(71) Applicant: Intel Corporation, Santa Clara, CA (US)

(72) Inventor: Tomas Galicia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 447 days.

(21) Appl. No.: 13/621,558

(22) Filed: Sep. 17, 2012

(65) Prior Publication Data

US 2014/0076475 A1    Mar. 20, 2014

(51) Int. Cl.
*G06F 17/28* (2006.01)
*B65C 9/42* (2006.01)
*G06F 9/44* (2006.01)

(52) U.S. Cl.
CPC ............. *B65C 9/42* (2013.01); *G06F 9/4448* (2013.01); *G06F 17/289* (2013.01)

(58) Field of Classification Search
USPC .......... 704/1–10; 707/748–750; 715/810–867
See application file for complete search history.

(56) References Cited

U.S. PATENT DOCUMENTS

| | | | |
|---|---|---|---|
| 7,814,101 B2 * | 10/2010 | Bitsch ........................... | 707/736 |
| 8,086,605 B2 * | 12/2011 | Xu et al. ....................... | 707/732 |
| 2003/0115552 A1 * | 6/2003 | Jahnke et al. ................. | 715/536 |
| 2004/0039989 A1 * | 2/2004 | Warren ......................... | 715/505 |
| 2012/0047146 A1 * | 2/2012 | Balakrishnan et al. ....... | 707/748 |
| 2012/0117504 A1 * | 5/2012 | Lemay et al. ................. | 715/772 |

* cited by examiner

*Primary Examiner* — Abul Azad
(74) *Attorney, Agent, or Firm* — International IP Law Group, P.L.L.C.

(57) ABSTRACT

A method and computing device for translating application labels are included herein in which a selection of an application label for translation may be detected. A customized label to replace the application label may also be received. The application label may be replaced with the customized label. Also, the selection of the customized label may be sent to data storage comprising customized labels.

19 Claims, 4 Drawing Sheets

TRANSLATING APPLICATION LABELS

BACKGROUND

1. Field

This disclosure relates generally to translating data in a computing system and more specifically, but not exclusively, to translating application labels in a computing system.

2. Description

Many applications are developed for use in various countries around the world. As a result, a variety of methods have been developed to translate application data into any number of languages. However, many of the translation methods rely on static translations of application data provided by developers to translators. For example, an application that is developed for use in multiple countries may be translated into multiple languages by different software developers. Some methods may use a different software developer for each supported language, which can result in a significant amount of time to translate the software into multiple languages. Furthermore, the translation of the application data into another language may rely on a small number of individuals translating the application data, oftentimes out of context, which can result in inaccurate and/or truncated translations.

BRIEF DESCRIPTION OF THE DRAWINGS

The following detailed description may be better understood by referencing the accompanying drawings, which contain specific examples of features of the disclosed subject matter.

DETAILED DESCRIPTION

According to embodiments of the subject matter disclosed in this application, application labels can be translated to allow users to view application labels in any suitable number of languages. Application labels, as referred to herein, can include any text that is displayed in association with an application or a selectable feature of an application, such as a button, menu option, icon, and the like. An application icon can include any image that expresses some property or feature of the application to the user and may be associated with a corresponding text label. For example, an application icon may include a particular image above an application label.

In some embodiments, application labels can be selected for translation. For example, a user may wish to view an application label translated into a different language. The translation of the application label can be received from various sources. For example, users may select a translation for an application label from a list of frequently selected translations. The application label can then be replaced with the translation. The translation may also be sent to data storage or a server and the translation may be ranked to determine the frequently selected translations. Data storage, as referred to herein, includes any suitable type of storage device that can store data. In some examples, data storage may include any type of non-volatile memory, volatile memory, or database, among others.

Reference in the specification to one embodiment or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
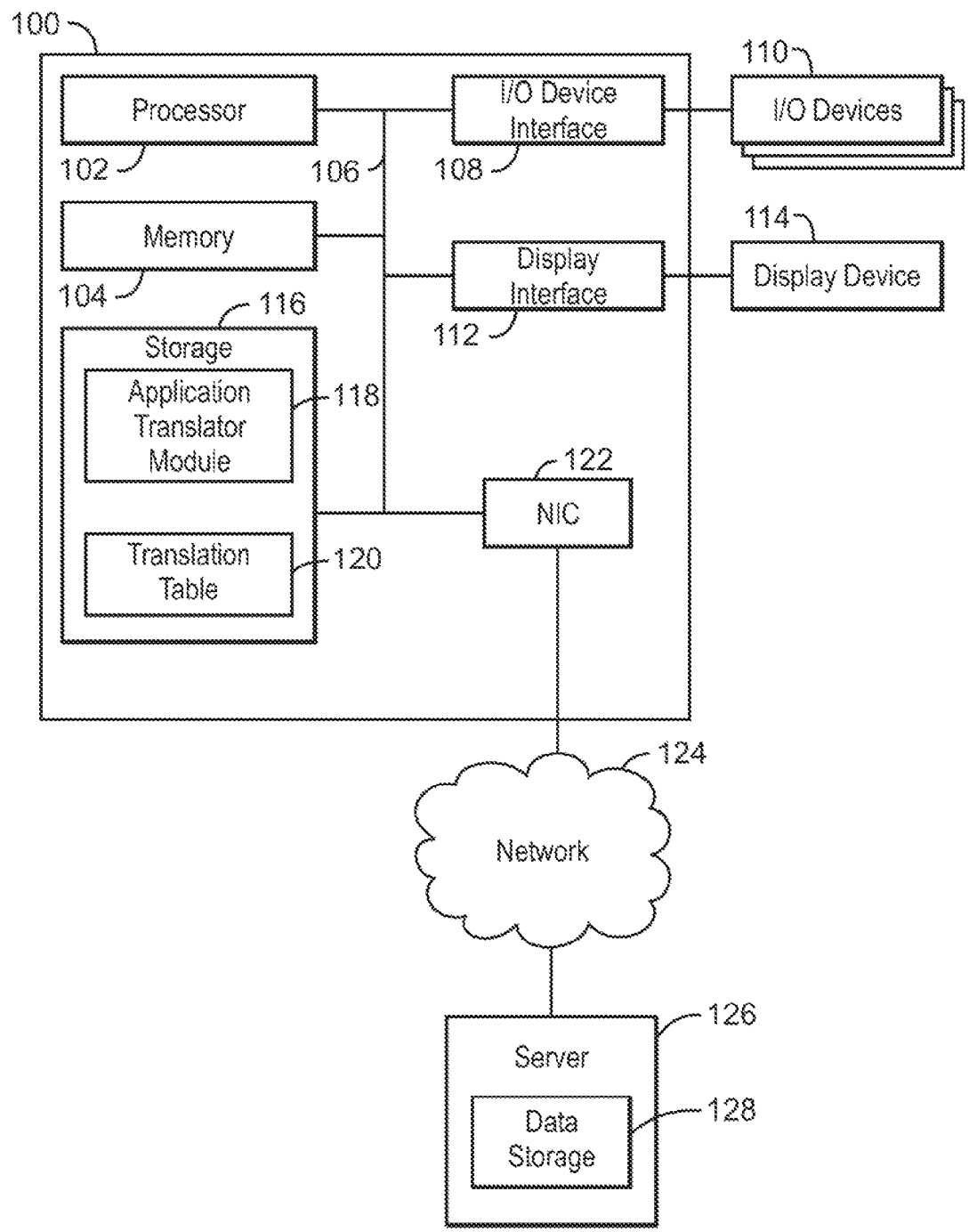
FIG. 1 is a block diagram of an example of a computing system that translate application labels.

FIG. 1 is a block diagram of an example of a computing system that can translate application labels. The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to implement a method that translates application labels.

The processor 102 may be connected through a system interconnect 106 (e.g., PCI, ISA, PCI-Express, HyperTransport®, NuBus, etc.) to an input/output (I/O) device interface 108 adapted to connect the computing system 100 to one or more I/O devices 110. The I/O devices 110 may include, for example, a keyboard and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system interconnect 106 to a display interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100.

The computing system 100 can also include a storage device 116. The storage device 116 can include a hard drive, an optical drive, a USB flash drive, an array of drives, or any combinations thereof. The storage device 116 may include an application translator module 118 that is adapted to translate application labels as described herein. The storage device 116 may also include a translation table 120. The translation table 120 can store any suitable number of translations for application labels in any appropriate number of languages. For example, the translation table 120 may include three entries for an application label, in which each entry in the translation table 120 stores a translation for the application label into an additional language.

The computing system 100 can also include a network interface card (NIC) 122 that may be adapted to connect the computing system 100 through the system interconnect 106 to a network 124. The network 124 may be a wide area network (WAN), local area network (LAN), or the Internet, among others. Through the network 124, the computing system 100 may communicate with a server 126. The server 126 can receive and send data related to translating application labels. In some embodiments, the server 126 can send data related to translating application labels to the computing system 100 and the computing system 100 can store the data related to translating application labels in the translation table 120.

In some examples, the application translator module 118 can translate application labels based on the input of any suitable number of individuals. For example, the application translator module 118 can receive translations from a server 126 that can store any appropriate number of translations for application labels. In some embodiments, the application translator module 118 can also receive a user-entered translation for an application label and submit the translation of the application label to a server 126. In some embodiments, the server 126 can store the translation of an application label in data storage 128. The server 126 can calculate a ranking for the translation of the application label based on the number of users that select the translation of the application label. For example, any number of users may replace an application label with the translation of the application label. The server 126 can share the ranking for the translation of the application label with the application translator module 118. Ranking user-entered translations of application labels and sharing the translations and rankings of the translations with other users can reduce the amount of time to translate application labels and increase the accuracy of application label translations.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., input devices, storage devices, additional network interfaces, etc.). Furthermore, any of the functionalities of the application translator module 118 may be partially, or entirely, implemented in hardware and/or in the processor 102. For example, the functionality may be implemented with an application specific integrated circuit, in logic implemented in the processor 102, in a display device 114, in a digital camera, among others.

Figure 2:
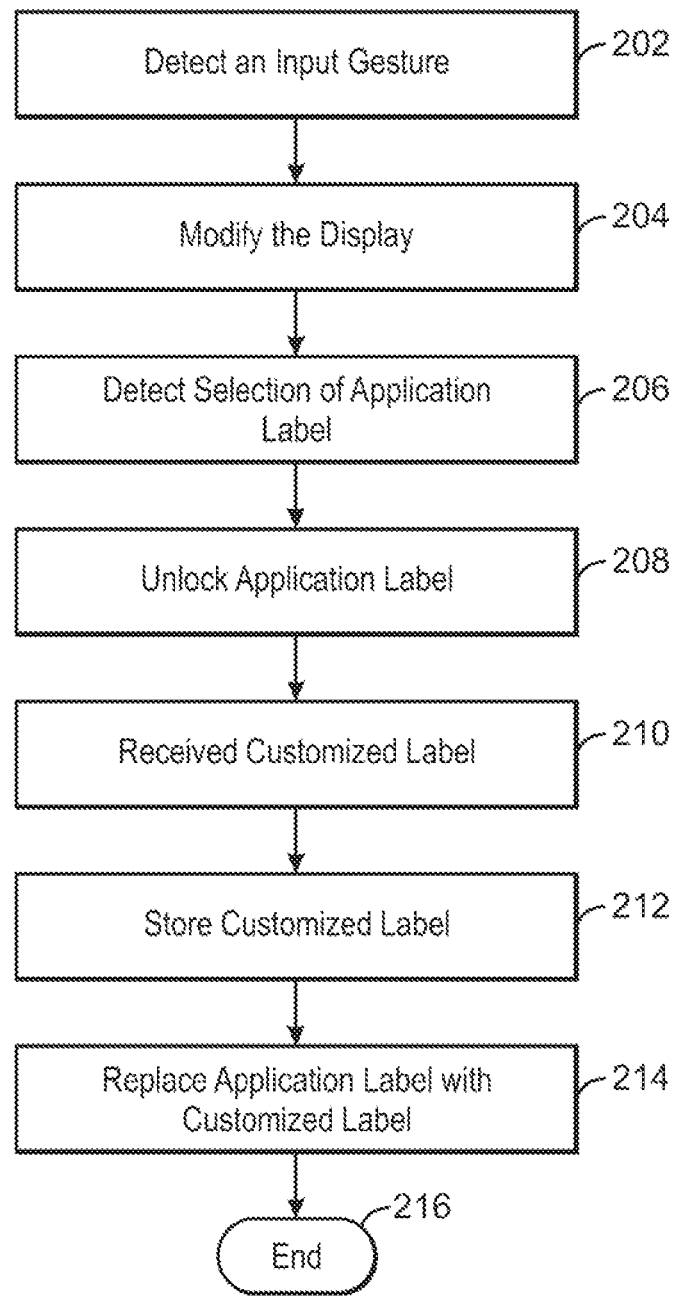
FIG. 2 is a process flow diagram showing an example of a method for translating application labels.

FIG. 2 is a process flow diagram showing an example of a method for translating application labels. The method for translating application labels may be implemented with a computing system, such as computing system 100 of FIG. 1. The computing system may include an application translator module 118 that can detect data related to application labels from an I/O device 110, data storage, or a server 126, among others.

At block 202, the application translator module 118 can detect an input gesture. In some embodiments, the input gesture can be a swipe of a touch screen device, input from a keyboard or mouse, or any other suitable type of input. In some examples, the input gesture can indicate the application translation module 118 is to be executed. In some embodiments, the application translation module 118 can enter a configuration state when the application translator module 118 is selected for execution. The configuration state can enable the application translation module 118 to detect the selection of an application label for translation and provide a translation for the selected application label.

At block 204, the application translator module 118 can modify the display to indicate the application translator module 118 is in a configuration state. In some embodiments, the application translator module 118 can modify the display to provide a menu. The menu can display various application icons and the corresponding application labels that may be modified. In other embodiments, the application translator module 118 can modify a standard display of application icons and application labels upon the selection of an application label. For example, the application translator module 118 may display a text box that allows users to provide translations for a selected application label.

At block 206, the application translator module 118 can detect the selection of an application label. In some embodiments, the application label may be selected by touching an application label or associated application icon on a touch screen display device. For example, the application translator module 118 may detect the selection of an application label or associated icon on a touch screen display device after the application label or associated icon is touched for a period of time. In some examples, an application label on a touch screen display device may be touched for five seconds before the application translator module 118 selects the application label for translation. In other examples, the application translator module 118 may detect the selection of an application label based on selected application labels in an application menu. For example, the application translator module 118 may detect when an application label from a file menu is selected.

At block 208, the application translator module 118 can unlock the application label. Unlocking an application label, as referred to herein, includes changing an application label from a read only state to a state in which the label can be modified. For example, the application translator module 118 can modify the application label once the application label is unlocked. Modifying the application label allows for users to view different text associated with application icons. For example, an email application may include an application label that includes the text "email." Unlocking the application label can allow the text "email" in this example to change to any suitable text.

At block 210, the application translator module 118 can detect a customized label. In some embodiments, the application translator module 118 can receive the customized label based on text received from an input device. For example, an input device, such as a keyboard or touch screen display, may receive a text string that is to be stored as the customized label. In other embodiments, the application translator module 118 can receive the customized label from various selections detected by the application translator module 118. For example, the application translator module 118 may detect a new language selection. The application translator module 118 may then receive a term from data storage or a server that corresponds with the new selected language. For example, the application translator module 118 may detect an application label that corresponds to a particular term. The application translator module 118 may then detect the translation for the particular term from the new selected language. In other embodiments, the application translator module 118 can detect a default language. The application translator module 118 can receive a term from data storage or a server that corresponds to a translation of the application label into the default language. In some embodiments, the application translator module 118 can detect a customized label from a list of optional application labels. The list of optional application labels can represent possible translations for a particular term. In some embodiments, the list of optional application labels can include translations for terms that are provided by other users. The list of optional application labels is discussed in greater detail below in relation to FIG. 3.

At block 212, the application translator module 118 can store the customized label. In some embodiments, the application translator module 118 can store the customized label in a storage device, such as the storage device 116 of FIG. 1, data storage, or a server, such as the server 126 of FIG. 1. In some examples, a selection of a customized label may be stored in a server. The selection of the customized label can indicate to the server which customized labels are frequently selected. In some embodiments, a storage device can contain a translation of several application labels for a computing system. For example, a storage device may contain a translation for any suitable number of application labels in a particular language.

At block 214, the application translator module 118 can replace the application label with the customized label. The customized label can then be displayed with the application icon that was initially associated with the application label. For example, an application label that includes the text "search" may be replaced with a customized label that includes the translation of the text "search" in a second language. The process ends at block 216.

The process flow diagram of FIG. 2 is not intended to indicate that the operations of the method 200 are to be executed in any particular order, or that all of the operations of the method 200 are to be included in every case. Further, any number of additional operations may be included within the method 200, depending on the specific application.

Figure 3:
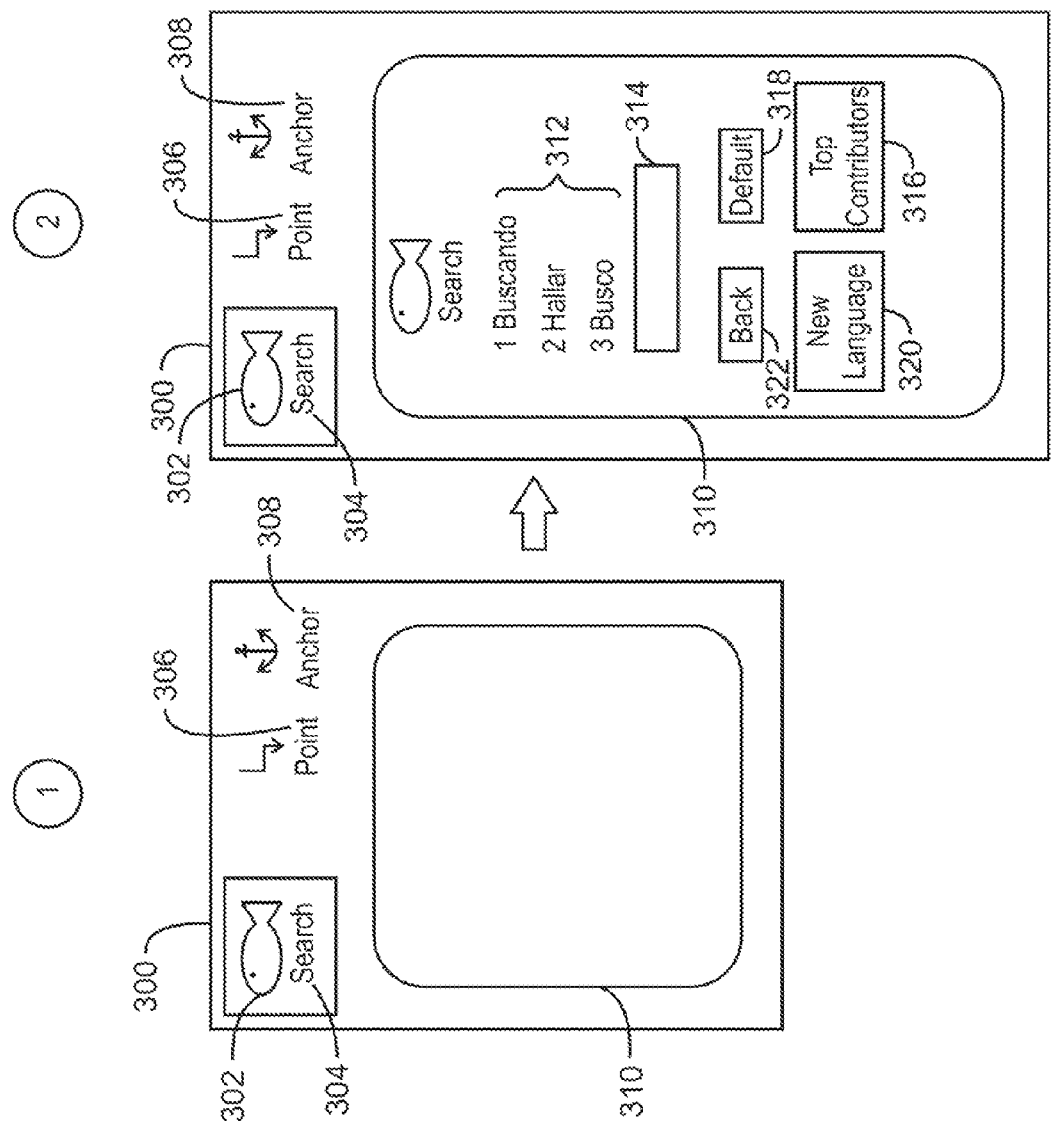
FIG. 3 is a graphical user interface showing an example of the operation of an application translator module that can translate application labels.

FIG. 3 is a graphical user interface (GUI) showing an example of the operation of an application translator module that can translate application labels. The application translator module 118 may be implemented in a computing system, such as the computing system 100 of FIG. 1.

The application translator module 118 can be selected for execution by any number of methods. The state of the computing system before the application translator module 118 has been selected is indicated by the circled 1 in FIG. 3. In some embodiments, a computing system may include a display device configured to display a GUI 300. The GUI 300 can display input detected from an input device, such as a mouse, or keyboard, among others. In some embodiments, the GUI 300 can also detect input. For example, the GUI 300 may detect the selection of the application translator module 118 for execution by any number of suitable methods. In some examples, the application translator module 118 may be selected with a "long press" of an application icon 302 or application label 304. The "long press," as referred to herein, can include any selection of a portion of a GUI 300 for a predetermined period of time. For example, a long press can include selecting an application icon 302 or application label 304, 306, or 308 for more than three seconds. The application icon 302 can include any image that corresponds with an application. The application label 304, as discussed above, can include any text related to an application. For example, the application label 304 includes the text "search," which can indicate that a selection of the application label 304 or the application 302 can allow a user to search for information.

In other embodiments, the application translator module 118 may be selected for execution with an input gesture. The input gesture may include any suitable contact of a display device or GUI 300. For example, an input gesture may select an application to execute with any swipe of a GUI 300 or a display device. In some examples, a user may touch any portion of the GUI 300 or display device in the shape of an "M" to execute an application. In some embodiments, the GUI 300 may display any information in a background region 310 before the application translator module 118 enters a configurable state.

The application translator module 118 can enter a configurable state if the application translator module 118 is selected for execution. The configurable state for the application translator module 118 is indicated by the circled 2 in FIG. 3. In the configurable state, the application translator module 118 can unlock an application label and detect a customized label that is to replace the application label. For example, the application translator module 118 may detect the selection of an application label, such as 304, 306, or 308, and provide a list of optional application labels 312. The list of optional application labels 312 can include any appropriate number of the top ranked translations of an application label 304, 306, or 308 in a particular language. For example, each translation of an application label 304, 306, or 308 may be sent from the application to a server. The server may determine the number of users that have selected the translation of an application label 304, 306, or 308 and provide a ranking to the application translator module 118. The application translator module 118 may then display the top ranked translations for a particular application label 304, 306, or 308 as a list of optional application labels 312. For example, the terms buscando, hallar, and busco may indicate the top three ranked Spanish translations for the "Search" application label 304.

In some examples, a user can enter a translation of an application label 304, 306, or 308 rather than selecting a translation of the application label 304, 306, or 308 from a list of optional translations 312. For example, the user may prefer a translation for an application label 304, 306, or 308 that is not displayed in the list of optional translations 312 of an application label 304, 306, or 308. The user may then enter a translation into an entry box 314 and the application translator module 118 may send the user generated translation of an application label 304, 306, or 308 to a server.

In some embodiments, users that provide a certain number of top ranked translations for application labels 304, 306, or 308 may be given special recognition as top contributors. Those selected for special recognition may be referred to as super users. The super users may have their names displayed in a top contributor section 316 of the application translator module 118. For example, the application translator module 118 may display a list of super users in a top contributor section 316 when the application translator module 118 is in a configurable state. In other embodiments, the application translator module 118 may display super user names next to the top ranked translations of application labels 304, 306, or 308 that are included in the list of optional application labels 312.

In some embodiments, the application translator module 118 can also include a default button 318 and a new language button 320. The default button 318, as discussed above, can indicate a default language from which to select a translation for an application label 304, 306, or 308. The application translator module 118 may translate a selected application label 304, 306, or 308 to the default language when the default button 318 is selected. For example, an application translator module 118 may have a default language set to French. A selected application label, such as the application label 304, may then be translated to the default language. In this example, the term "search" may be translated into French, and the term "search" may be replaced with a corresponding French term.

The new language button 320 can indicate the application translator module 118 is to display a list of optional application labels 312 in a different language. For example, the new language button 320 may indicate that the application translator module 118 is to display a list of German translations for the term "search" rather than Spanish translations for the term "search."

The application translator module 118 may end the configuration state in response to any suitable input or timeout value. For example, the application translator module 118 may end the configuration state after a timeout value. A timeout value can include a period of time that has elapsed without additional input. The application translator module 118 may also end the configuration state in response to the selection of a button. For example, a button, such as the back button 322, on the GUI 300 may be selected to end the configuration state.

It is to be understood that the block diagram of FIG. 3 is not intended to indicate that an application is to include all of the components shown in FIG. 3. Rather, the application translator module 118 may include fewer or additional components not illustrated in FIG. 3. For example, the application translator module 118 may also include components that allow for data within an application to be translated. In this example, the application translator module 118 may translate text in an application menu, such as a file menu.

Figure 4:
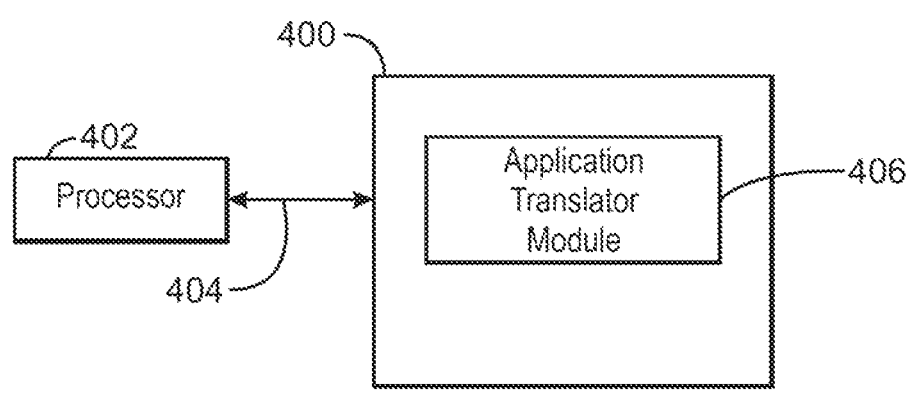
FIG. 4 is a block diagram of an example of a tangible, non-transitory computer-readable medium that can translate application labels.

FIG. 4 is a block diagram of an example of a tangible, non-transitory computer-readable medium that can translate application labels. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method.

The various software components discussed herein may be stored on the tangible, non-transitory, computer-readable medium 400, as indicated in FIG. 4. For example, an application translator module 406 may be adapted to direct the processor 402 to translate application labels. It is to be understood that any number of additional software components not shown in FIG. 4 may be included within the tangible, non-transitory, computer-readable medium 400, depending on the specific application.

EXAMPLE 1

A method for translating application labels is described herein. The method can include detecting a selection of an application label for translation. The method can also include receiving a customized label to replace the application label. In addition, the method can include replacing the application label with the customized label. Furthermore, the method can include sending the selection of the customized label to data storage comprising customized labels.

In some embodiments, the method for translating application labels may simultaneously replace the application label with the customized label and send the selection of the customized label to data storage comprising customized labels. Also, upon detecting the selection of the application label, the method can provide a list of possible label translations for the application label from the data storage of customized labels. Alternatively, the method for translating application labels may detect input text from an input device, and identify the input text as the customized label.

EXAMPLE 2

A computing device is described herein. The computing device includes an input device that is adapted to detect an input gesture, a processor to execute stored instructions, and a storage device that stores computer-readable instructions. The computer-readable instructions can direct the processor to detect an input gesture and detect a selection of an application label for translation. The computer-readable instructions can also direct the processor to unlock the application label to allow for detection of a customized label. In addition, the computer-readable instructions can direct the processor to detect the customized label to replace the application label. Furthermore, the computer-readable instructions can direct the processor to store the customized label and replace the application label with the customized label.

The computing device may also send a customized label to data storage. In some examples, the computing device may also detect a request for a new display language, send the request for a new display language to data storage, receive a new display language, and identify the customized label based on the new display language. In some embodiments, the computing device may also receive a list of top contributors of customized labels, and display the list of top contributors of customized labels.

EXAMPLE 3

At least one machine readable medium having instructions stored therein is described herein. In response to being executed on a computing device, the instructions cause the computing device to detect an input gesture and detect a selection of an application label for translation. The instructions can also cause the computing device to unlock the application label to allow for detection of a customized label. In addition, the instructions can cause the computing device to detect the customized label to replace the application label. Furthermore, the instructions can cause the computing device to replace the application label with the customized label. The instructions can also cause the computing device to send the selection of the customized label to data storage comprising customized labels.

In some examples, detecting the customized label to replace the application label may include detecting a request to restore a default application language, detecting the default application language, and identifying the customized label based on the default application language. Alternatively, detecting the customized label to replace the application label may include detecting a list of optional application labels, displaying the list of optional application labels, detecting a selection from the list of optional application labels, and identifying the customized label based on the selection.

EXAMPLE 4

A computing device is described herein. The computing device includes a processor to execute stored instructions, and a storage device that stores computer-readable instructions. The instructions can direct the processor to receive a customized label from a second computing device. The instructions can also direct the processor to calculate a ranking for the customized label. Furthermore, the instructions can direct the processor to send the ranking for the customized label to the second computing device.

The computing device may also calculate the ranking for a customized label based on a number of times the customized label is selected by any suitable number of computing devices. In addition, the computing device may also determine a list of top ranked customized labels based on rankings for any suitable number of customized labels.

Although an example embodiment of the disclosed subject matter is described with reference to block and flow diagrams in FIGS. 1-4, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A computer-implemented method for translating application labels comprising:
   detecting, via a processor, a selection of an application label for translation;
   providing, via the processor, a list of possible label translations, wherein the list of possible label translations comprises a plurality of possible label translations based on a ranking corresponding to a frequency with which the possible label translations are selected;
   detecting, via the processor, a customized label to replace the application label from the list of possible label translations, the customized label detected based on a translation of the application label from a first language to a second language;
   replacing, via the processor, the application label with the customized label; and
   sending, via the processor, the selection of the customized label to data storage comprising customized labels.

2. The method of claim 1, wherein the list of possible label translations is ordered according to the frequency with which the customized labels are selected.

3. The method of claim 1, wherein receiving the customized label comprises:
   detecting input text from an input device; and
   identifying the input text as the customized label.

4. The method of claim 1, wherein receiving the customized label comprises:
   detecting a request for a new display language;
   sending the request for a new display language to a server;
   receiving a new display language; and
   identifying the customized label based on the new display language.

5. The method of claim 1 comprising:
   receiving a list of top contributors of customized labels; and
   displaying the list of top contributors of customized labels.

6. The method of claim 1, comprising entering a configuration state based on an input gesture.

7. The method of claim 6, wherein the input gesture is a swipe of a display device.

8. A computing device comprising:
   an input device that is adapted to detect an input gesture;
   a processor to execute stored instructions; and
   a storage device that stores computer-readable instructions that, when executed by the processor, direct the processor to:
      detect the input gesture;
      detect a selection of an application label for translation;
      unlock the application label to allow for detection of a customized label;
      provide a list of possible label translations, wherein the list of possible label translations comprises a plurality of possible label translations based on a ranking corresponding to a frequency with which the possible label translations are selected;

detect the customized label to replace the application label from the list of possible label translations, the customized label detected based on a translation of the application label from a first language to a second language;

store the customized label; and replace the application label with the customized label.

9. The computing device of claim 8, wherein the computer-readable instructions direct the processor to:

detect input text from an input device; and identify the input text as the customized label.

10. The computing device of claim 8, wherein the computer-readable instructions direct the processor to send the customized label to data storage.

11. The computing device of claim 8, wherein the computer-readable instructions direct the processor to:

detect a request for a new display language;

send the request for a new display language to a server;

receive a new display language; and identify the customized label based on the new display language.

12. The computing device of claim 8, wherein the computer-readable instructions direct the processor to:

receive a list of top contributors of customized labels; and display the list of top contributors of customized labels.

13. The computing device of claim 8, wherein the computer-readable instructions direct the processor to:

detect a request to restore a default application language;

detect the default application language; and identify the customized label based on the default application language.

14. The computing device of claim 8, wherein the input gesture is a swipe of a display device.

15. At least one non-transitory machine readable medium comprising a plurality of instructions that, in response to being executed on a computing device, cause the computing device to:

detect an input gesture;

detect a selection of an application label for translation;

unlock the application label to allow for detection of a customized label;

provide a list of possible label translations, wherein the list of possible label translations comprises a plurality of possible label translations based on a ranking corresponding to a frequency with which the possible label translations are selected;

detect the customized label to replace the application label from the list of possible label translations, the customized label detected based on a translation of the application label from a first language to a second language;

replace the application label with the customized label; and send the selection of the customized label to data storage comprising customized labels.

16. The non-transitory machine readable medium of claim 15, wherein the instructions further cause the computing device to:

detect input text from an input device; and identify the input text as the customized label.

17. The non-transitory machine readable medium of claim 15, wherein the instructions further cause the computing device to:

detect a request to restore a default application language;

detect the default application language; and identify the customized label based on the default application language.

18. The non-transitory machine readable medium of claim 15, wherein the instructions further cause the computing device to:

detect a request for a new display language;

send the request for a new display language to a server;

receive a new display language; and identify the customized label based on the new display language.

19. The non-transitory machine readable medium of claim 15, wherein the instructions further cause the computing device to:

receive a list of top contributors of customized labels; and display the list of top contributors of customized labels.

* * * * *